United States Patent [19]
Brown et al.

[11] Patent Number: 5,779,105
[45] Date of Patent: Jul. 14, 1998

[54] AIR OPERATED GREASE GUN

[75] Inventors: C. Brandon Brown; Steven W. Post, both of Jonesboro, Ark.

[73] Assignee: McNeil (Ohio) Corporation, St. Paul, Minn.

[21] Appl. No.: 909,281

[22] Filed: Aug. 11, 1997

[51] Int. Cl.$^6$ .................................................. G01F 11/00
[52] U.S. Cl. ...................................................... 222/262
[58] Field of Search .................................. 222/258, 261, 222/262, 263, 334, 386

[56] References Cited

U.S. PATENT DOCUMENTS

| | | | |
|---|---|---|---|
| 1,856,372 | 5/1932 | Buchet | 222/262 |
| 1,918,833 | 7/1933 | Carter | 222/262 X |
| 1,939,943 | 12/1933 | Barks | 222/262 X |
| 1,949,497 | 3/1934 | Stafford et al. | 222/262 X |
| 2,113,333 | 4/1938 | Piquerez | 222/262 X |
| 2,134,735 | 11/1938 | Reinhold | 222/262 |
| 2,505,839 | 5/1950 | Scovell | 222/262 |
| 4,298,144 | 11/1981 | Pressl . | |

*Primary Examiner*—Kevin P. Shaver
*Attorney, Agent, or Firm*—Howell & Haferkamp, L.C.

[57] ABSTRACT

An automatic air operated grease gun comprising a reciprocating grease plunger for ejecting grease, and a piston, connected to the plunger, for operating the plunger. The piston is slidably mounted in a cylinder to move between a retracted position and an advanced position. A return spring resiliently biases the piston to its retracted position. A switch selectively connects the cylinder to a source of gas under pressure to advance the piston against the return spring. The piston has a plurality of apertures therein, each aperture having an individual seal, and a release for opening the individual seals to relieve the pressure behind the cylinder and allow it to retract under the force of the return spring.

6 Claims, 5 Drawing Sheets

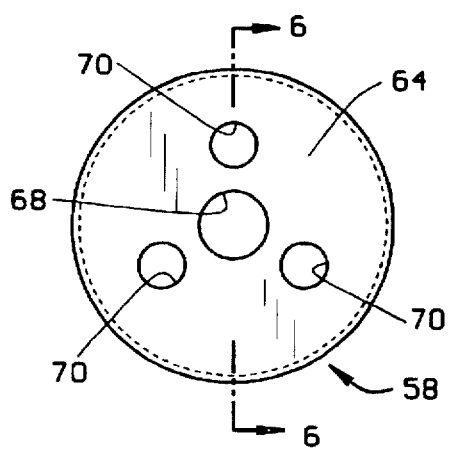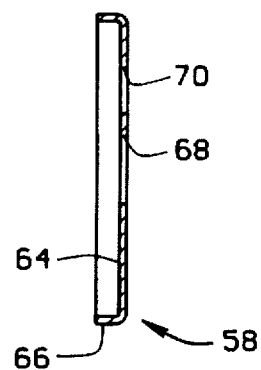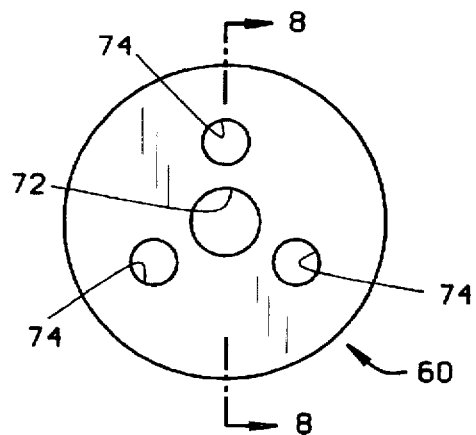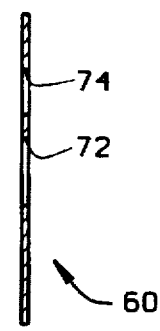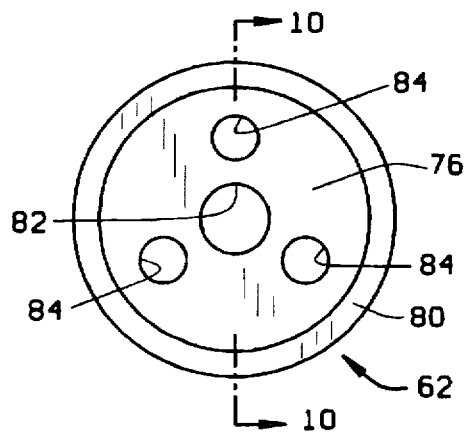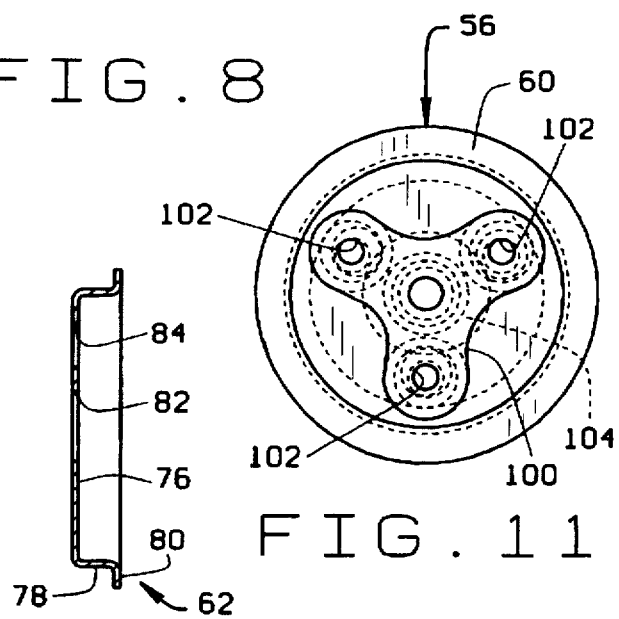

AIR OPERATED GREASE GUN

FIELD OF THE INVENTION

This invention relates to an air operated grease gun, and in particular to a grease gun with a reciprocating plunger driven by a piston in a cylinder.

BACKGROUND OF THE INVENTION

In one type of air operated grease gun previously available, a reciprocating plunger ejects grease from the tip of the gun. The plunger is driven by a piston reciprocating in a cylinder. Air pressure in the cylinder advances the piston in the cylinder against the force of a return spring, until the piston reaches a position where a release opens a seal over apertures in the piston, allowing the air pressure to escape and the piston to retract under the force of the return spring.

This type of air operated grease gun suffers from at least two disadvantages. The opening of the seal results in a significant pressure drop in the pressure of the grease ejected by the gun, resulting in large swings in the grease application pressure. Furthermore, the piston must be relatively large and rigid, and carefully manufactured to close tolerances so that the seal can close all of the apertures so that the piston functions properly. This makes the piston very expensive, increasing the total cost of the grease gun.

SUMMARY OF THE INVENTION

The grease gun of the present invention is of simple and inexpensive construction. It reduces the larger pressure swings that can occur in prior art air operated grease guns. Moreover, the construction eliminates the need for a large, and carefully and expensively fabricated piston, allowing the piston to be fabricated from inexpensive stamped parts.

Generally, the air operated grease gun of the present invention comprises a reciprocating grease plunger for ejecting grease. A piston, connected to the plunger for operating the plunger, is slidably mounted in a cylinder to move between a retracted position and an advanced position. A return spring resiliently biases the piston to its retracted position. There is a valve for selectively connecting the cylinder to a source of gas under pressure to advance the piston against the return spring. The piston has a plurality of apertures therein, and each aperture has an individual seal. There is a release for opening the individual seals to relieve the pressure behind the cylinder and allow it to retract under the force of the return spring.

The use of individual seals for the apertures, rather than a large seal encompassing all of the apertures, reduces the pressure differential at the point where the release opens the seals, thereby allowing the air operated grease gun to operate at a more constant pressure. Furthermore the reduction in the size of the seal means larger tolerances can be used, eliminating the need for a large, carefully and expensively machined piston.

These and other features and advantages will be in part apparent, and in part pointed out hereinafter.

BRIEF DESCRIPTION OF THE DRAWINGS

FIG. 5 is a bottom plan view of the return spring seat;

FIG. 6 is a cross sectional view of the return spring seat taken along the plane of line 6—6 in FIG. 5;

FIG. 7 is a plan view of the washer;

FIG. 8 is a cross sectional view of the washer taken along the plane of line 8—8 in FIG. 7;

FIG. 9 is a front plan view of the U-cup seat;

FIG. 10 is a cross sectional view of the U-cup seat taken along the plane of line 10—10 in FIG. 9;

FIG. 11 is a rear end view of the piston; and

Corresponding reference numerals indicate corresponding parts through out the drawings.

DETAILED DESCRIPTION OF THE PREFERRED EMBODIMENT

Figure 1:
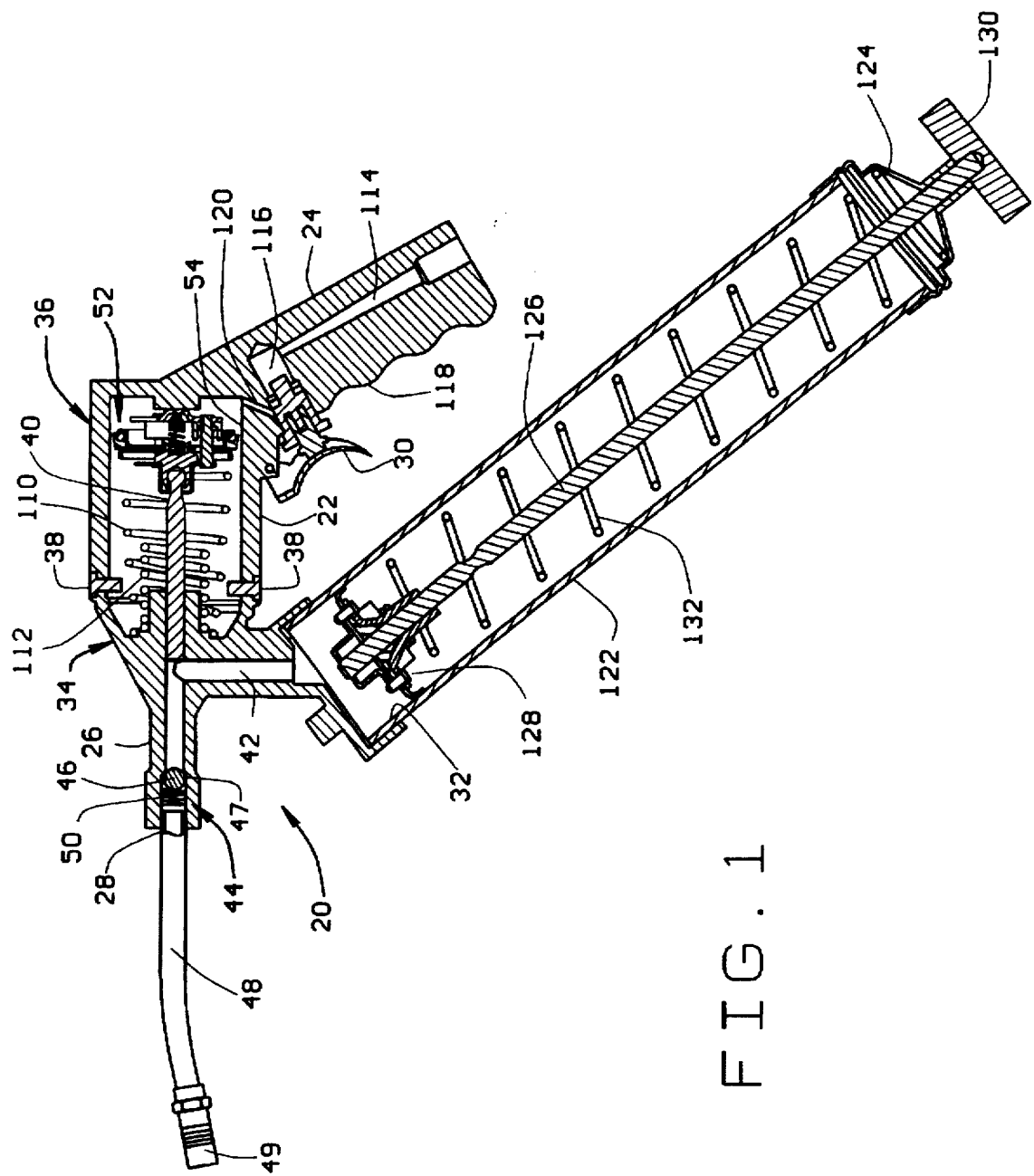
FIG. 1 is a vertical, longitudinal cross-sectional view of an air operated grease gun constructed according to the principles of this invention with the piston in its retracted position in the cylinder.
Figure 2:
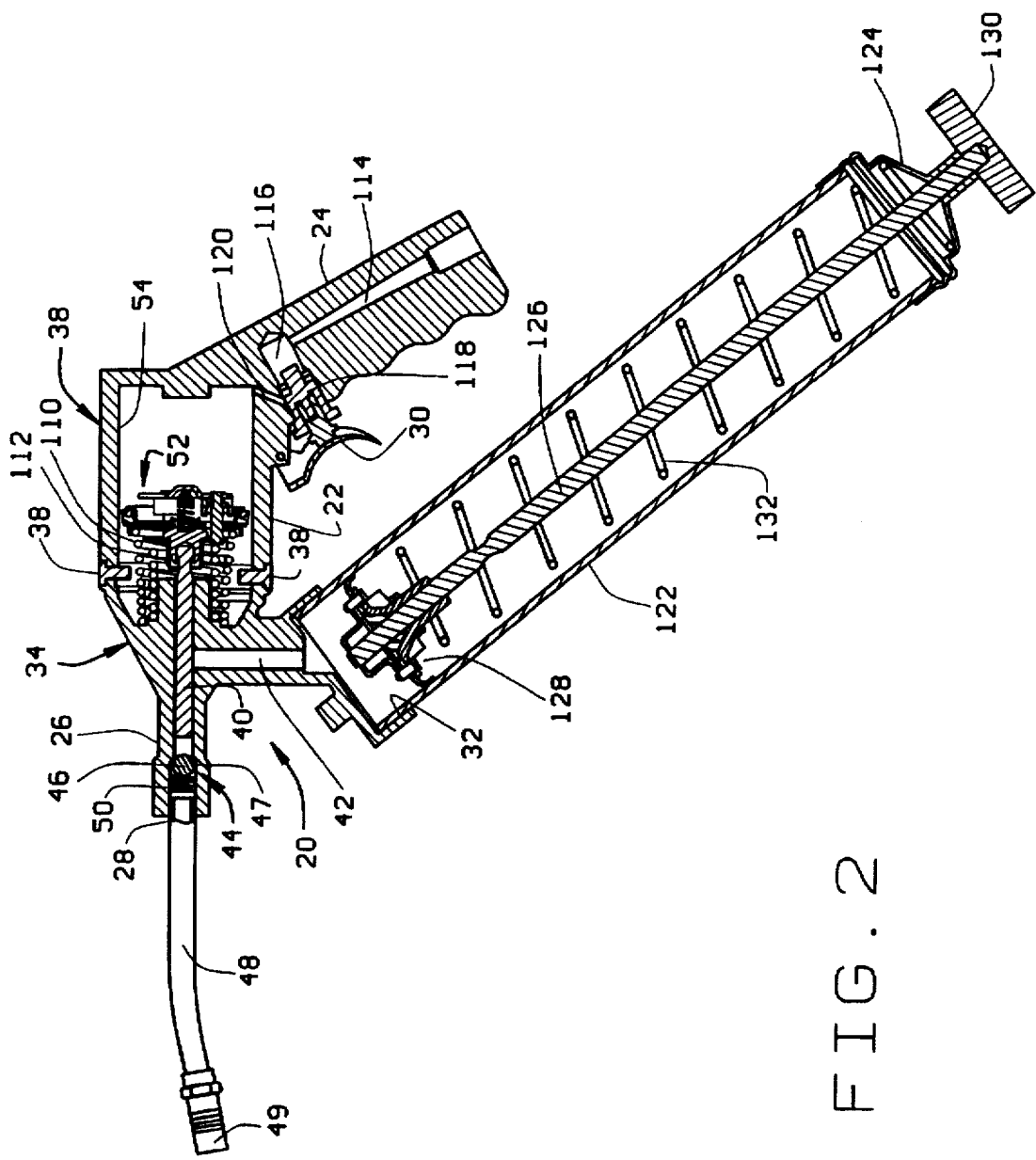
FIG. 2 is a vertical, longitudinal cross-sectional view of the grease gun, with the piston in its extended position.

An air operated grease gun constructed according to the principles of this invention is indicated generally as 20 in FIG. 1 and 2. The gun 20 comprises a body 22 with a hand grip 24 extending from the rear of the body, and a barrel 26 extending from the front of the body having an opening 28 therein for ejecting grease. A trigger 30 is mounted adjacent the hand grip 24 for operating the grease gun 20. A socket 32 for mounting a supply of grease, is located on the underside of the body 22, adjacent the front. The body 22 is preferably formed from interfiling front and back sections 34 and 36, secured together with screws 38.

The gun 20 operates by the reciprocation of a plunger 40 in the barrel 26. The back stroke of the plunger 40 draws grease from the grease supply connected to the socket 32 via passage 42, and the forward stroke of the plunger pushes grease through the opening 28 of the barrel 26, which has a check valve 44. The check valve 44 comprises a ball 46, resiliently biased by spring 50, that seats against a shoulder 47 formed inside the barrel 26. The check valve 44 allows grease to flow out of the barrel 26 on the forward stroke of the plunger 40, but prevents reflux on the back stroke of the plunger. An extension tube 48 having a fitting 49 on its end, can be installed in the opening 28 of the barrel 26 to direct the delivery of the grease from the gun 20. The spring 50 separates the ball 46 from the extension tube 48.

Figure 3:
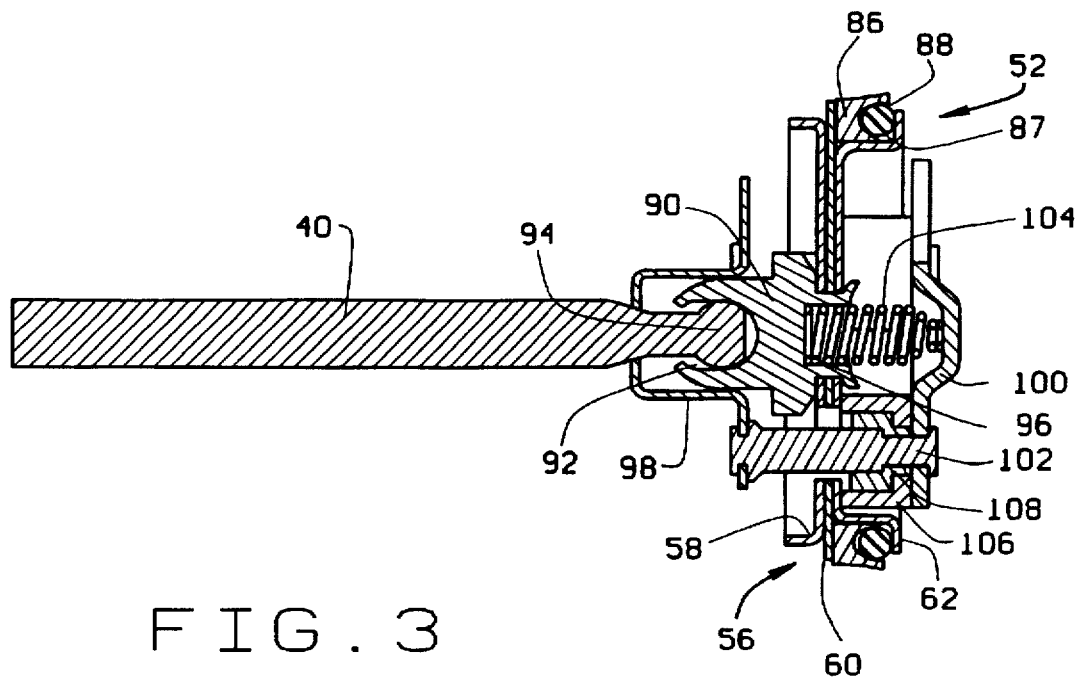
FIG. 3 is an enlarged view of the piston that reciprocates in the cylinder in the body of the gun with the apertures closed.
Figure 4:
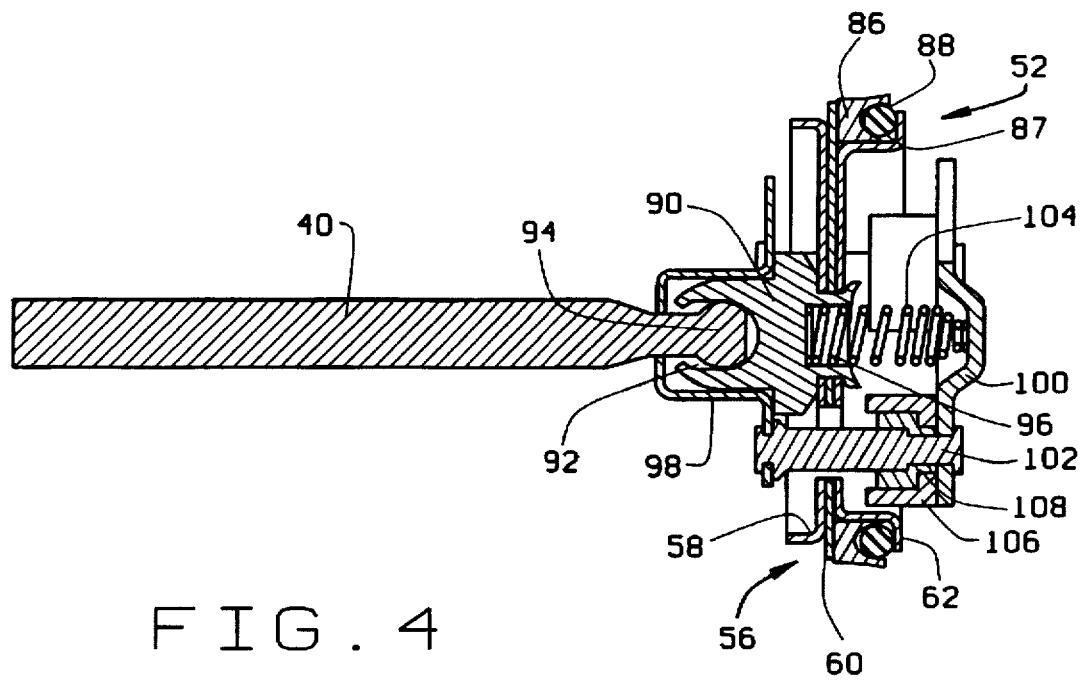
FIG. 4 is an enlarged view of the piston with the apertures open.

The plunger 40 is driven by the reciprocation of piston 52 in cylinder 54 inside the body 22. As best shown in FIGS. 3 and 4, the piston 52 comprises a unique U-cup seat weldment 56 formed from three pieces, a shallow cup-shaped return spring seat 58 (FIGS. 5 and 6), a washer 60, and a dish-shaped U-cup seat 62. The return spring seat 58 has a generally circular bottom 64 surrounded by a cylindrical rim 66, and a central opening 68 surrounded by three apertures 70. The washer 60 (FIGS. 7 and 8) is generally circular, with larger diameter than the return spring seat 58. There is a central opening 72 in the washer, surrounded by three apertures 74. The U-cup seat 62 has a generally circular bottom 76 surrounded by a cylindrical rim 78 having a radially extending flange 80. There is a central opening 82 in the U-cup seat 62 (FIGS. 9 and 10), surrounded by three apertures 84. The return spring seat 58, the washer 60, and the U-cup seat 62 can each be made inexpensively, for example by stamping, and they are secured together with their respective apertures aligned, for example with spot welds.

An annular U-cup 86, having a groove 87 in one face, is mounted with an O-ring 88 in the groove, on the U-cup seat weldment 56, between the washer 60 and the U-cup seat 62, for sealing with the wall of the cylinder 54.

An aligning socket 90 is located on the forward side of the weldment 56, and comprises a forward section with a socket 92 for receiving and engaging the rounded end 94 of the plunger 40, and a rearward section that extends through the aligned central apertures in the weldment, and has a socket 96 therein for seating the valve spring, as described below. The socket 92 is swaged to enclose the end 94 of the plunger 40, and retain it while permitting the plunger to swivel. There is a hat-shaped valve guide 98 on the front side of the weldment 56, and a three-lobed washer 100 on the rear side of the weldment, connected by three pins 102, one pin extending through each of the apertures in the weldment. A valve spring 104 extends between the rearward section of the aligning socket 90 and the three-lobed washer 100, to resiliently bias the washer 100 away from the weldment 56.

A cup shaped rubber packing 106 surrounds each pin 102 and is held against the washer 100 with a spacer 108, that is engaged by a shoulder on the pin 102. The cup-shaped packing 106 are adapted to engage the edge margins of the apertures through the weldment 56 and seal them.

A return spring 110 is positioned in the cylinder 54, in front of the piston 52, extending between the front of the cylinder and the return spring seat 58. An actuation spring 112 is also positioned in the cylinder 54, in front of the piston 52 at the front of the cylinder, concentrically inside the return spring 110 in position so that when the piston is at the front of the cylinder, the actuation spring engages the valve guide 98.

The handle 24 is adapted to be connected to a source of air under pressure, and has a passage 114 therein extending to a trigger chamber 116. The trigger 30 is pivotally mounted to the body 22 of the gun, and operates a valve 118 that selectively connects the trigger chamber 116 to the back of the cylinder 54 via passage 120.

The socket 32 is adapted to mount a grease tube 122, which is closed with an end cap 124. A follower rod 126 extends through the end cap 124 and has a follower assembly 128 on the end inside the tube 122, and a handle 130 on the end outside the tube. A follower spring 132 is mounted concentrically over the follower rod 126, between the follower assembly 128 and the inside of the cap 124, to resiliently bias the follower assembly upwardly in the tube 122.

OPERATION

In operation, the grease tube 122 is filled with grease, either by installing a prefilled cartridge in the tube, or by drawing grease from a bulk supply into the tube with the handle 130, or by pumping it into the tube. The handle 24 of the grease gun 20 is then connected to a source of air under pressure, and the gun is ready for use.

In the retracted position, the apertures through the weldment 56 forming the piston 52 are sealed with the packing 106 because the return spring 110 pushes the piston rearwardly with sufficient force to overcome the force of spring 104 and hold the piston against the packing 106 on the washer 100. When the trigger 30 is depressed, it operates the valve 118 to allow air under pressure into the back of the cylinder 54. The air pressure advances the piston 52 in the cylinder 54 against the return spring 110, until the valve guide 98 engages the actuator spring 112. Continued forward movement of the piston 52 compresses the actuator spring 112 against the valve guide 98 until the force of the actuator spring on the valve guide, and the force of the spring 104 on the washer 100 unseat the packing 106 from around the apertures. This allows the air pressure to escape from behind the piston 52, allowing the return spring 110 to return the piston to the back of the cylinder 54 where the piston is again pressed against the packing 106 to seal the apertures, and the cycle continues until the trigger 30 is released.

The reciprocation of the piston 52 causes the plunger 40 to reciprocate. On the back stroke of the plunger 40, grease is drawn from the tube 122, through the passage 42 into the barrel 26 of the gun 20. On the forward stroke of the plunger 40, the plunger pushes grease out the opening 28 of the barrel 26, through the check valve 44, through extension tube 48 and out fitting 49.

When the trigger 30 is finally released, pressurized air from the trigger chamber 116 is cut off from the cylinder 54, and any air in the cylinder behind the piston 52 can vent through the trigger mechanism, allowing the return spring 110 to return the piston to the back of the cylinder ready for use.

In contrast to prior art air operated grease guns, the grease gun 20 of the present invention employs separate packing 106 for each aperture, rather than a single large packing or seal. This reduces the pressure differential at the valve shift point—the point where the force of the valve spring 104 and the actuation spring 112 exceeds the air pressure differential across the piston. The reduction of this differential provides a more even application pressure. Moreover, the large seal employed in the prior art required that the piston be fairly substantial and machined to close tolerances to seal across the relatively large diameter of the packing or sealing member. The individual packing 106 employed with the present invention allow the use of a smaller and less precise piston that can be formed from inexpensive formed (e.g. stamped) pieces, rather that expensive and elaborately machined parts.

Figure 12:
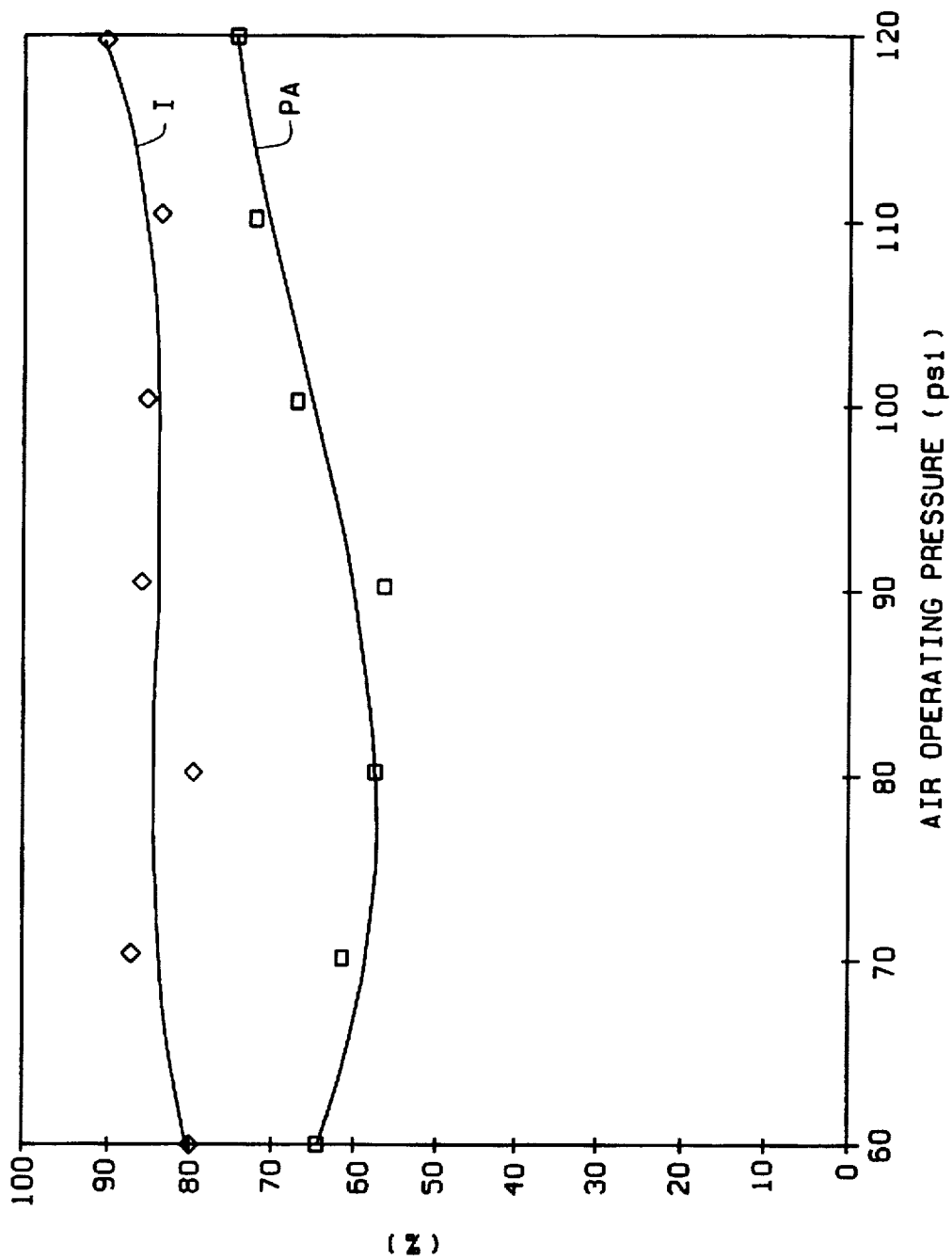
FIG. 12 is a graph of the percent of grease stall pressure of the valve shift point versus operating air pressure for a grease gun constructed according to the present invention and a prior art grease gun.

FIG. 12 is a graph of the percent of grease stall pressure at valve shift point versus air operating pressure for a grease gun constructed according to the principles of the present invention (I) versus a prior art grease gun (PA). FIG. 12 illustrates that a grease gun constructed according to the principles of the present invention (I) has a valve shift point that is a higher percentage of its stall pressure than a typical prior art grease gun (PA). This means that for a given operating pressure and piston ratio, a grease gun constructed according the principles of the present invention will be able to operate in its automatic reciprocating mode at a higher pressure than a conventional prior art grease gun, or put another way a conventional grease gun will cease to function in the automatic reciprocating mode at a lower pressure than a grease gun constructed according to the principles of the present invention.

What is claimed is:

1. In an automatic air operated grease gun of the type in which a grease plunger is operated by the reciprocation of a piston in a cylinder caused by air pressure repeatedly advancing the piston against a return spring until a release is triggered to open a plurality of apertures on the piston, releasing the air pressure and allowing the piston to retreat under the force of the spring, the improvement comprising separate closures for each of the apertures operated by the release to open the apertures.

2. The grease gun according to claim 1 wherein the piston comprises a shallow cup shaped member having a generally circular bottom surrounded by a sidewall; a generally flat disc; and a shallow dish shaped member having a generally circular bottom surrounded by a sidewall, and a generally radial lip extending from the sidewall.

3. An automatic air operated grease gun comprising a reciprocating grease plunger for ejecting grease, a piston, connected to the plunger for operating the plunger, the piston slidably mounted in a cylinder to move between a retracted position and an advanced position, a return spring for resiliently biasing the piston to its retracted position, a valve for selectively connecting the cylinder to a source of gas under pressure to advance the piston against the return spring, the piston having a plurality of apertures therein, each aperture having an individual seal, and a release for opening the individual seals to relieve the pressure behind the cylinder and allow it to retract under the force of the return spring.

4. The automatic air operated grease gun according to claim 3 wherein each individual seal comprises a cup shaped seal member sized to fit over the aperture.

5. An automatic air operated grease gun comprising a reciprocating grease plunger, a piston slidably mounted in a cylinder and connected to the plunger to operate the plunger; a return spring in the cylinder to bias the plunger; a valve for selectively connecting the cylinder to a source of air under pressure to advance the plunger against the spring, the piston having a plurality of apertures therein and a seal for each of the apertures, and a release for releasing the seals to relieve the air pressure behind the piston to allow it to retreat under the force of the return spring, the advance and retreat of the piston reciprocating the grease plunger to deliver grease from the gun.

6. An automatic air operated grease gun comprising a reciprocating grease plunger for ejecting grease, a piston, connected to the plunger for operating the plunger, the piston slidably mounted in a cylinder to move between a retracted position and an advanced position, a return spring for resiliently biasing the piston to its retracted position, a valve for selectively connecting the cylinder to a source of gas under pressure to advance the piston against the return spring, the piston having a plurality of apertures therein, a sealing assembly comprising first and second members on the front and back sides of the piston, respectively, connected by pins extending through the apertures, and individual sealing members on the second member each sealing member in position to surround and seal its respective aperture, trigger for acting on the first member to release the seals to relieve the pressure behind the cylinder and allow it to retract under the force of the return spring.

* * * * *